(12) United States Patent
Hashimoto et al.

(10) Patent No.: US 10,549,464 B2
(45) Date of Patent: Feb. 4, 2020

(54) SYNTHETIC RESIN MOLDING AND MOLDING METHOD THEREFOR

(71) Applicant: KASAI KOGYO CO., LTD., Kanagawa (JP)

(72) Inventors: Shinya Hashimoto, Ebina (JP); Hiroki Komatsuzaki, Kanagawa (JP)

(73) Assignee: KASAI KOGYO CO., LTD., Koza-Gun, Kanagawa (JP)

( * ) Notice: Subject to any disclaimer, the term of this patent is extended or adjusted under 35 U.S.C. 154(b) by 197 days.

(21) Appl. No.: 15/507,384

(22) PCT Filed: Jun. 19, 2015

(86) PCT No.: PCT/JP2015/003079
§ 371 (c)(1),
(2) Date: Feb. 28, 2017

(87) PCT Pub. No.: WO2016/084270
PCT Pub. Date: Jun. 2, 2016

(65) Prior Publication Data
US 2017/0291336 A1 Oct. 12, 2017

(30) Foreign Application Priority Data
Nov. 25, 2014 (JP) .................................. 2014-237638

(51) Int. Cl.
*B29C 45/27* (2006.01)
*B29L 31/30* (2006.01)

(52) U.S. Cl.
CPC .... *B29C 45/2708* (2013.01); *B29K 2995/002* (2013.01); *B29K 2995/0022* (2013.01); *B29L 2031/3041* (2013.01)

(58) Field of Classification Search
None
See application file for complete search history.

(56) References Cited

U.S. PATENT DOCUMENTS

2006/0216479 A1  9/2006  Cowelchuk et al.
2007/0281133 A1  12/2007  Smith et al.

FOREIGN PATENT DOCUMENTS

CN  101547812 A   9/2009
DE  102006013230 A1  10/2006
(Continued)

OTHER PUBLICATIONS

Office Action dated Nov. 13, 2017 in a corresponding German application No. 112015005321.2.
(Continued)

*Primary Examiner* — Monica A Huson
(74) *Attorney, Agent, or Firm* — United IP Counselors, LLC

(57) ABSTRACT

A molding method for a synthetic resin molding that includes a molding body, a bent portion, and a flange. The bent portion and the flange are continuous in a longitudinal direction of the side edge. The flange includes a wide portion and a narrow portion. The molding method for the synthetic resin molding includes arranging a gate at a position corresponding to an end of one side of the flange in a longitudinal direction, performing injection molding using a colored resin material containing a luster agent kneaded in the material, and forming a protrusion along the side edge in the longitudinal direction at a back of a boundary portion between the flange and the molding body to reduce interference of flow of the molten resin from the flange toward the molding body during the injection molding.

4 Claims, 2 Drawing Sheets

(56) References Cited

FOREIGN PATENT DOCUMENTS

| JP | S63-112127 A | 5/1988 |
|---|---|---|
| JP | H06-320607 A | 11/1994 |
| JP | H07-304071 A | 11/1995 |
| JP | 3074185 U | 10/2000 |
| JP | 2003-170468 A | 6/2003 |
| JP | 2011-146227 A | 7/2011 |
| JP | 2012-255113 A | 12/2012 |
| JP | 2014-176974 A | 9/2014 |
| WO | 2014/142062 A1 | 9/2014 |

OTHER PUBLICATIONS

International Search Report for International Application No. PCT/JP2015/003079 dated Aug. 11, 2015, Japan.
Examination Report for corresponding Indian application No. 201717006764 dated Sep. 27, 2019, 5 pages.

SYNTHETIC RESIN MOLDING AND MOLDING METHOD THEREFOR

CROSS-REFERENCE TO RELATED APPLICATIONS

This application is a National Stage Entry application of PCT International Application No. PCT/JP2015/003079, filed on Jun. 19, 2015, which claims the priority benefit of Japanese Patent Application No. 2014-237638, filed on Nov. 25, 2014, the entire contents of both of which are hereby incorporated by reference.

BACKGROUND

1. Technical Field

The present invention relates to a synthetic resin molding used as an automotive interior decorative component, such as an automotive trim, and a molding method for the synthetic resin molding.

2. Description of the Background

Synthetic resin moldings used as automotive interior decorative components may be injection-molded pieces with a high quality appearance of metallic luster using a metallic colored resin material, which is a resin material into which a luster agent containing metallic powder, such as aluminum powder, has been kneaded.

A synthetic resin molding formed by injection molding can typically have weld lines, or flow lines, resulting from a disturbed flow of the molten resin. For a molding formed using a metallic colored resin material, in particular, a disturbed flow of the molten resin can disturb the orientation of the luster agent. This destabilizes the color tones and cannot produce intended design effects.

Techniques have been known to prevent such weld lines in synthetic resin moldings formed by injection molding. One such technique described in, for example, Japanese Unexamined Patent Application Publication No. 7-304071 (hereinafter referred to as "Patent Literature 1") allows the resin injected through a plurality of gates to flow uniformly along a continuous thin portion on a back surface portion of a molding corresponding to the gates.

BRIEF SUMMARY

A synthetic resin molding such as an automotive trim that is mounted to cover the surface of a counterpart panel has a bent portion bending toward its back surface at one side edge of its plate-like trim body, and a flange protruding laterally from the bent portion. The bent portion and the flange are continuous with each other along the length of the side edge. The flange serves as a mounting member with which the molding is mounted onto the counterpart panel.

The flange has an irregular width, and includes a wide portion and narrow portions, in correspondence with the contours of the counterpart panel. This allows fitting between the corresponding surfaces overlapping each other.

In this manner, the plate-like automotive trim has a complex and irregular outer shape with the flange including the wide and narrow portions. The flange is continuous with the bent portion arranged at one side edge. In this structure, the molten resin in the flange can flow in a disturbed manner, and can affect the flow in the trim body. This can create weld lines on the design surface of the trim body.

For a molding formed using a metallic colored resin material, in particular, a disturbed flow of the molten resin can disturb the orientation of the luster agent, and can greatly degrade the design effects of the design surface. This is unavoidable even with the technique described in Patent Literature 1.

In one aspect of the present invention, even if a molding body includes a bent portion arranged on its side edge and bending toward its back surface, and a flange continuous with the bent portion and including wide and narrow portions, that is the flange has a complex and irregularly shape, it can reduce a disturbed flow of molten resin at the side edge during injection molding. This allows the design surface of the molding body to have aesthetic appearance in the synthetic resin molding including the molding body.

Another aspect of the present invention is directed to the synthetic resin molding.

A molding method for a synthetic resin molding according to one aspect of the present invention is a molding method for a synthetic resin molding including a molding body, a bent portion arranged on a side edge of the molding body and bending toward a back surface of the molding body, and a flange protruding laterally from the bent portion. The bent portion and the flange are continuous in a longitudinal direction of the side edge. The flange includes a wide portion and a narrow portion protruding by a smaller amount than the wide portion. The method includes arranging a gate at a position corresponding to an end of one side of the flange in a longitudinal direction, performing injection molding using a colored resin material containing a luster agent kneaded in the material, and forming a protrusion along the side edge in the longitudinal direction at a back of a boundary portion between the flange and the molding body to reduce interference of flow of the molten resin from the flange toward the molding body during the injection molding.

A synthetic resin molding according to another aspect of the present invention includes a molding body, a bent portion arranged on a side edge of the molding body and bending toward a back surface of the molding body, and a flange protruding laterally from the bent portion. The bent portion and the flange are continuous in a longitudinal direction of the side edge. The flange includes a wide portion and a narrow portion protruding by a smaller amount than the wide portion. The synthetic resin molding is an injection-molded piece formed using a gate arranged at a position corresponding to an end of one side of the flange in a longitudinal direction, and using a colored resin material containing a luster agent kneaded in the material. The synthetic resin molding includes a protrusion along the side edge in the longitudinal direction at a back of a boundary portion between the flange and the molding body to reduce interference of flow of the molten resin from the flange toward the molding body during the injection molding.

The synthetic resin molding and the molding method according to embodiments of the present invention allow the molten resin to narrow as the resin flows from a cavity area corresponding to the wide portion of the flange into a cavity area downstream in the molten resin flow corresponding to the narrow portion of the flange when a colored resin material containing a luster agent kneaded in the material is injected through a gate arranged at a position corresponding to an end of one side of the flange in the longitudinal direction, and tends to overflow into the main stream of the molten resin in the cavity area corresponding to the molding body during injection molding of the synthetic resin molding.

The cavity area corresponding to the protrusion at the back of a boundary portion between the flange and the molding body receives the overflowing molten resin to reduce interference of the molten resin flow toward the cavity area corresponding to the molding body.

This structure prevents the molten resin around the wide portion of the flange from flowing toward the molding body in a disturbed manner and affecting the flow in the molding body.

This structure prevents the orientation of the luster agent in the colored resin material from being disturbed by the disturbed flow of the molten resin in the molding body, and allows the design surface of the molding body to have aesthetic appearance, and enhances the design effects of the synthetic rein molding.

DETAILED DESCRIPTION

Embodiments of the present invention will be described with reference to the drawings.

Figure 1:
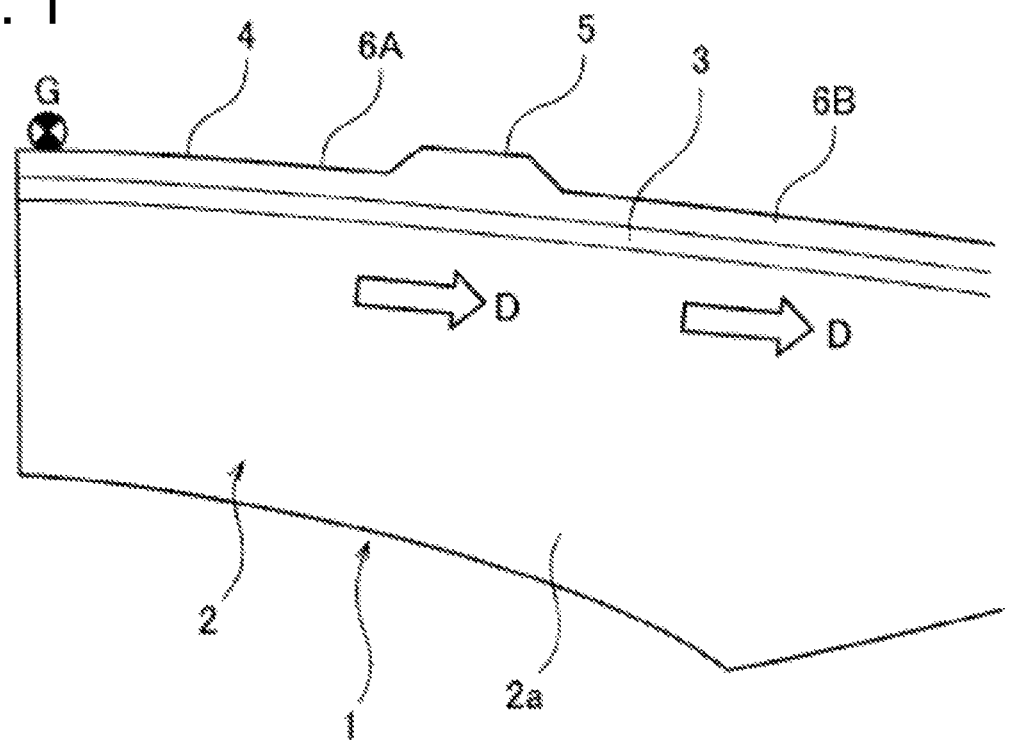
FIG. 1 is an explanatory side view of a synthetic resin molding according to an embodiment of the present invention.

FIG. 1 shows a decorative plate 1 that is used as an armrest of an automotive trim, which is a synthetic resin molding according to one embodiment of the present invention. The decorative plate 1 is injection-molded into an intended shape with a mold using an appropriate synthetic resin material. The decorative plate 1 is used as an interior decorative component for decorating a side surface of an armrest (not shown) (hereafter referred to as a counterpart).

In the present embodiment, the decorative plate 1 is molded with a mold using a metallic colored resin material, which is a resin material into which a luster agent containing metal powder, such as aluminum powder, has been kneaded. A plate body 2 for covering the side surface of the counterpart is shaped into a plate with an intended thickness to develop high quality metallic luster to the surface.

Figure 2:
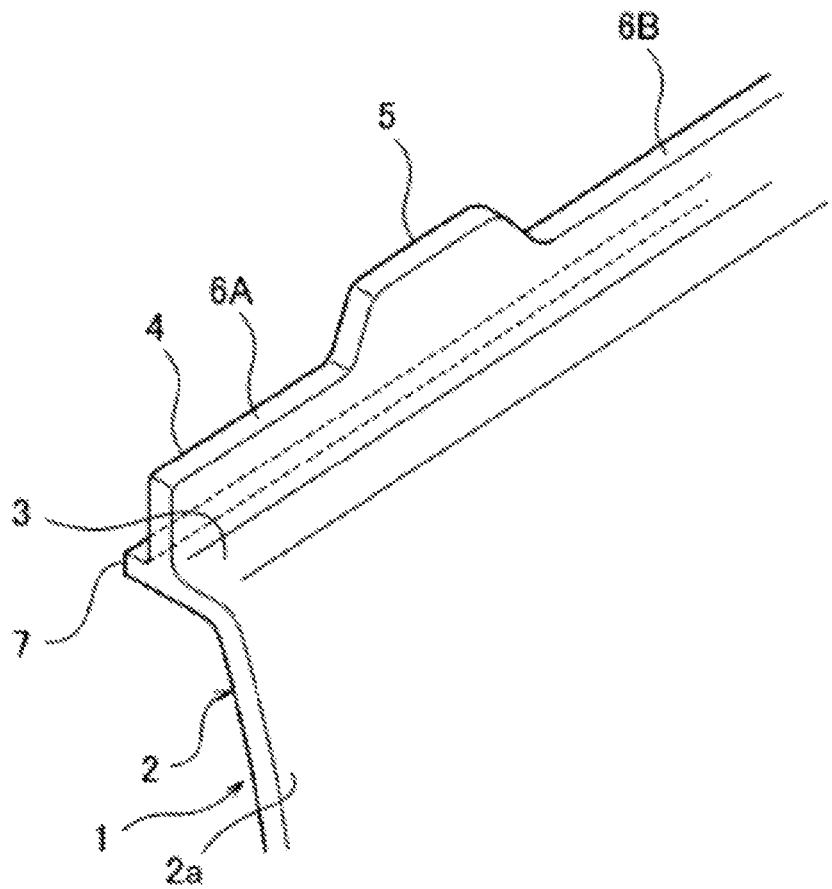
FIG. 2 is an explanatory enlarged perspective view of the synthetic resin molding shown in FIG. 1 showing its main components.

As shown in FIG. 2 as well, the plate body 2 has, at its one side edge such as its upper edge, a bent portion 3 and a flange 4. The bent portion 3 bends toward the back surface of the plate body 2. The flange 4 protrudes upward from the bent portion 3. The bent portion 3 and the flange 4 are continuous in the longitudinal direction. The flange 4 serves as a mounting member with which the molding is mounted onto the counterpart.

The flange 4 includes a wide portion 5, which protrudes by a larger amount, and narrow portions 6A and 6B, in correspondence with the contours of the counterpart. This allows fitting between the corresponding surfaces engaging with each other.

When this decorative plate 1 is formed by injection molding, the gate of the mold (not shown) is positioned as indicated by letter G in FIG. 1, which corresponds to a predetermined position at an end of one side of the flange 4 in the longitudinal direction, to prevent a gate mark from locating on a design surface 2a of the plate body 2.

During injection molding, the molten resin material injected from the gate position G flows in the cavity of the mold from the area corresponding to the flange 4 toward the areas corresponding to the bent portion 3 and the plate body 2 while spreading across the plate surface.

As described above, the plate body 2 has, at its side edge, the bent portion 3, and the flange 4 extending linearly from the bent portion 3. The flange 4 has the irregular shape including both the wide portion 5 and the narrow portions 6A and 6B. The flow of the molten resin narrows as the resin flows from a cavity area corresponding to the wide portion 5 into a cavity area corresponding to the adjacent narrow portion 6B of the flange 4 downstream in the flow of the molten resin.

As a result, the molten resin injected from the gate position G can flow in a disturbed manner around the boundary area between the wide portion 5 and the downstream narrow portion 6B. The disturbed flow can cause a portion of the molten resin flowing in the cavity area corresponding to the wide portion 5 to overflow obliquely toward the cavity area corresponding to the plate body 2. This can change the direction of the main stream of the molten resin in the cavity area corresponding to the plate body 2.

In the present embodiment, as shown in FIG. 2, a protrusion 7 is formed at the back of a boundary portion between the flange 4 and the plate body 2, and is formed along the side edge of the plate body 2 in the longitudinal direction. The protrusion 7 reduces interference of the molten resin flow from the flange 4 toward the plate body 2 during injection molding.

In the example shown in FIG. 2, the protrusion 7 protrudes from the back of the corner where the bent portion 3 and the flange 4 meet.

The protrusion 7 may extend along substantially the full length of the side edge of the plate body 2 from a predetermined position downstream from the gate position G. The protrusion 7 in the present embodiment extends in a predetermined length range defined between the upstream narrow portion 6A and the downstream narrow portion 6B in the molten resin flow with the wide portion 5 of the flange 4 located in the middle of the range.

When the decorative plate 1 is formed by injection molding, a molten metallic colored resin material is injected from the gate position G, which corresponds to a position at an end of one side of the flange 4 in the longitudinal direction. As described above, the injected molten metallic colored resin material flows into the cavity of the mold from the area corresponding to the flange 4 toward the areas corresponding to the bent portion 3 and the plate body 2 while spreading across the plate surface.

The molten resin material flowing in the longitudinal direction in the cavity area corresponding to the flange 4 increases from the cavity area corresponding to the narrow portion 6A toward the cavity area corresponding to the wide portion 5, and then usually narrows at the junction with the cavity area corresponding to the downstream narrow portion 6B as described above. This tends to cause the molten resin to overflow into the main stream in the cavity area corresponding to the plate body 2.

In the present embodiment, a cavity area corresponding to the protrusion 7 is formed in the predetermined length range defined between the upstream narrow portion 6A and the downstream narrow portion 6B in the molten resin flow with the wide portion 5 of the flange 4 located in the middle of the range. The cavity area corresponding to the protrusion 7 receives a portion of the molten resin overflowing from the cavity area corresponding to the wide portion 5 to reduce interference of the molten resin flow into the cavity area corresponding to the plate body 2.

This prevents a portion of the molten resin flowing into the cavity area corresponding to the wide portion 5 from overflowing obliquely toward the cavity area corresponding to the plate body 2 and causing a disturbed flow of the molten resin, which can affect the flow in the plate body 2.

This structure thus allows the luster agent to be orientated downstream in the molten resin flow substantially uniformly from the gate position G as indicated by the arrow D in FIG. 1.

This structure prevents the orientation of the luster agent in the colored resin material from being disturbed by the disturbed flow of the molten resin in the plate body 2, and allows the design surface 2a of the plate body 2 to have aesthetic appearance, and enhances the design effects of the decorative plate 1.

Figure 3:
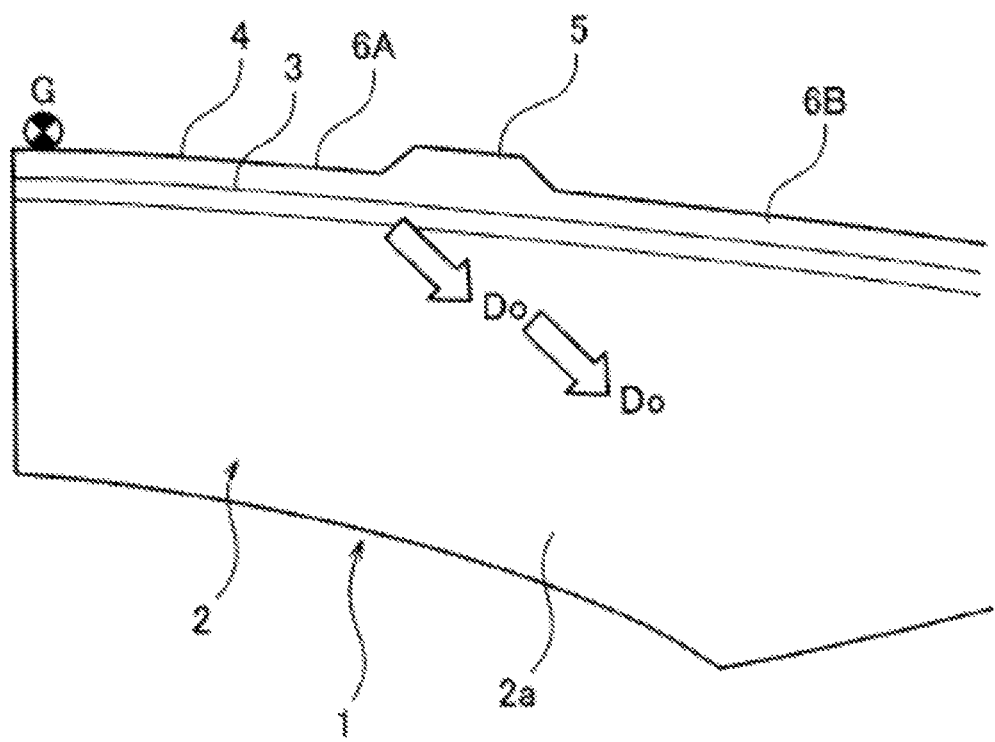
FIG. 3 is an explanatory side view of a synthetic resin molding according to a comparative example shown in the same manner as in FIG. 1.

FIG. 3 is a diagram showing a comparative example of the present embodiment. In the comparative example, no protrusion 7 is formed at the back of the boundary portion between the flange 4 and the plate body 2 for reducing interference of the molten resin flow from the flange 4 toward the plate body 2.

The structure of the comparative example narrows the molten resin flow from the cavity area corresponding to the wide portion 5 of the flange 4 into the cavity area corresponding to the downstream narrow portion 6B adjacent to the wide portion 5 in the molten resin flow during injection molding.

As a result, the flow of the molten resin injected from the gate position G can be disturbed around the boundary area between the wide portion 5 and the downstream narrow portion 6B. The disturbed flow can cause a portion of the molten resin flowing in the cavity area corresponding to the wide portion 5 to overflow obliquely toward the cavity area corresponding to the plate body 2. This tends to change the direction of the main stream of the molten resin in the cavity area corresponding to the plate body 2.

For the molding formed using the metallic colored resin material, in particular, the luster agent flows obliquely from the bent portion 3 toward the plate body 2 as indicated by the arrow $D_0$ in FIG. 3 to create a weld line in the boundary area between the wide portion 5 and the downstream narrow portion 6B in the molten resin flow, and disturbs the orientation of the luster agent. This can cause irregular orientation of the luster agent at the design surface 2a and can degrade the color tones and luster.

In the present embodiment, as described above, the orientation of the luster agent is uniform without being disturbed in the cavity area corresponding to the wide portion 5. The design surface 2a of the plate body 2 can have aesthetic appearance, and enhance the design effects.

Although the protrusion 7 has substantially the same thickness as the flange 4 in the example shown in FIG. 2, at least one of the plate thickness or the protruding amount of the protrusion 7 may be larger as the wide portion 5 of the flange 4 protrudes by a larger amount to further reduce interference of the molten resin flow during injection molding.

The protrusion 7 may extend on the back surface of the bent portion 3, which is continuous with the plate body 2 and the flange 4, in the longitudinal direction of the bent portion 3, and protrude on the back surface of the bent portion 3. This structure also produces the same advantageous effects as described above.

Although the decorative plate 1 used as an armrest of an automotive trim is described as an example of the synthetic resin molding according to the present embodiment, the synthetic resin molding may be any of other various synthetic resin components, in addition to an automotive trim.

The resin material may not be a metallic colored resin material, and may be a general-purpose resin material containing no luster agent to produce the same advantageous effects as described above.

REFERENCE SIGNS LIST

1 decorative plate (synthetic resin molding)
2 plate body (molding body)
3 bent portion
4 flange
5 wide portion
6A narrow portion
6B narrow portion (adjacent narrow portion downstream from wide portion)
7 protrusion to reduce interference of molten resin flow
G gate position
D orientation direction of luster agent

The invention claimed is:

1. A molding method for a synthetic resin molding, the method comprising:
   preparing a mold configured to form the synthetic resin molding, the synthetic resin molding including
      a molding body having a side edge,
      a bent portion arranged on the side edge and bending in a first direction,
      a flange extending from the bent portion in a second direction orthogonal to the first direction, the flange including a wide portion, and a narrow portion continuous with the wide portion and having a shorter length in the second direction than the wide portion, and
      a protrusion protruding in the first direction from a boundary portion between the bent portion and the flange,
   the mold including a gate at a position corresponding to an end of the narrow portion; and
   injecting a colored resin material from the gate into the mold, the colored resin material containing a luster agent kneaded in the material,
   wherein the gate at the position corresponding to the end of the narrow portion is single, and
   the luster agent contains metal powder.

2. The molding method for the synthetic resin molding according to claim 1, wherein
   the protrusion extends along the narrow portion with the wide portion located in a middle.

3. The molding method for the synthetic resin molding according to claim 1, wherein
   a plate thickness and/or a protruding amount of the protrusion is larger as the length of the wide portion in the second direction is longer.

4. The molding method for the synthetic resin molding according to claim 2, wherein
   a plate thickness and/or a protruding amount of the protrusion is larger as the length of the wide portion in the second direction is longer.

* * * * *